United States Patent
Hong

(10) Patent No.: US 11,310,694 B2
(45) Date of Patent: Apr. 19, 2022

(54) METHOD AND DEVICE FOR RECEIVING DOWNLINK DATA DURING RRC INACTIVE STATE

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 258 days.

(21) Appl. No.: 16/453,938

(22) Filed: Jun. 26, 2019

(65) Prior Publication Data

US 2019/0320346 A1 Oct. 17, 2019

Related U.S. Application Data

(63) Continuation of application No. PCT/CN2017/093418, filed on Jul. 18, 2017.

(30) Foreign Application Priority Data

Dec. 28, 2016 (CN) .......................... 201611239295.3

(51) Int. Cl.
*H04W 28/04* (2009.01)
*H04L 1/16* (2006.01)
*H04W 72/12* (2009.01)

(52) U.S. Cl.
CPC ............... *H04W 28/04* (2013.01); *H04L 1/16* (2013.01); *H04W 72/1273* (2013.01)

(58) Field of Classification Search
CPC . H04W 28/04; H04W 72/1273; H04W 76/20; H04W 24/08; H04L 1/16; H04L 1/188; H04L 1/1671; H04L 1/08
See application file for complete search history.

(56) References Cited

U.S. PATENT DOCUMENTS

2016/0278066 A1* 9/2016 Sakurai ..................... H04L 1/08
2019/0190659 A1* 6/2019 Tang ....................... H04L 1/1635

FOREIGN PATENT DOCUMENTS

| CN | 101267253 A | 9/2008 |
| CN | 101499883 A | 8/2009 |
| CN | 105517174 A | 4/2016 |
| CN | 106664710 A | 5/2017 |
| CN | 106792880 A | 5/2017 |

(Continued)

OTHER PUBLICATIONS

Sony, "Downlink data transmission in RRC_INACTIVE", Nov. 2016, 3GPP TSG RAN WG2 Meeting #96 R2-168551 (Year: 2016).*

(Continued)

*Primary Examiner* — Justin T Van Roie
(74) *Attorney, Agent, or Firm* — Arch & Lake LLP

(57) ABSTRACT

Provided are a method and device for receiving downlink data. The method includes: when a terminal is in a target status and receives downlink data sent by a base station, detecting whether the downlink data is successfully received or not and obtaining the detection result; generating target signaling for indicating the detection result; and sending the target signaling to the base station so that the base station resends the downlink data to the terminal when it is determined, according to the target signaling, that the terminal does not successfully receive the downlink data.

8 Claims, 10 Drawing Sheets

(56) References Cited

FOREIGN PATENT DOCUMENTS

| EP | 3029890 A1 | 6/2016 | |
|---|---|---|---|
| WO | 2014198479 A1 | 12/2014 | |
| WO | WO-2018018478 A1 * | 2/2018 | ........... H04L 1/1635 |

OTHER PUBLICATIONS

I. L. Da Silva, G. Mildh, M. Säily and S. Hailu, "A novel state model for 5G Radio Access Networks," 2016 IEEE International Conference on Communications Workshops (ICC), Kuala Lumpur, Malaysia, 2016, pp. 632-637, doi: 10.1109/ICCW.2016.7503858. (Year: 2016).*
Liu et al., Space-Time-Frequency Coded OFDM Over Frequency-Selective Fading Channels, Oct. 2002, IEEE Transactions on Signal Processing, vol. 50, No. 10 (Year: 2002).*
International Search Report (with English translation) and Written Opinion issued in PCT/CN2017/093418, dated Oct. 27, 2017, 9 pages.
Chinese First Office Action (including English translation) issued in CN 201611239295, dated Dec. 29, 2017, 14 pages.
Chinese Second Office Action (including English translation) issued in CN 201611239295, dated May 31, 2018, 16 pages.
Chinese Third Office Action (including English translation) issued in CN 201611239295, dated Sep. 6, 2018, 16 pages.
Chinese Fourth Office Action (including English translation) issued in CN 201611239295, dated May 17, 2019, 14 pages.
CATT, "DL Small Data Transmission in Inactive State", Discussion and Decision, 3GPP TSG-RAN WG2 Meeting #96, R2-167955, Reno, Nevada, Nov. 14-18, 2016, (3p).

* cited by examiner

METHOD AND DEVICE FOR RECEIVING DOWNLINK DATA DURING RRC INACTIVE STATE

CROSS-REFERENCE TO RELATED APPLICATION

This application is a continuation application of PCT Application No. PCT/CN2017/093418, filed Jul. 18, 2017, which is based upon and claims priority to Chinese Patent Application No. 201611239295.3, filed Dec. 28, 2016, the entire contents of all of which are incorporated herein by reference.

TECHNICAL FIELD

The present disclosure generally relates to the field of communications, and more particularly, to a method and device for transmitting downlink data.

BACKGROUND

In the related art, Radio Resource Control (RRC) supports two states, i.e., an idle (IDEL) state and a connected (CONNECTED) state. If the terminal is in an idle state, it needs to switch from the idle state to the connected state before receiving downlink data sent by the base station.

At present, the related art does not support other RRC states.

SUMMARY

The present disclosure provides a method and device for transmitting downlink data.

According to a first aspect of the present disclosure, there is provided a method for transmitting downlink data, where the method is applied in a terminal, and includes: when the terminal is in a target state and receives downlink data sent by a base station, detecting whether the downlink data is successfully received, and obtaining a detection result; generating a target signaling for indicating the detection result; and sending the target signaling to the base station, so that the base station resends the downlink data to the terminal when determining that the terminal does not successfully receive the downlink data according to the target signaling.

According to a second aspect of the present disclosure, there is provided a method for confirming data transmission, where the method is applied to a base station, and includes: sending downlink data to a terminal in a target state; receiving a target signaling for indicating whether the terminal successfully receives a detection result of the downlink data sent by the terminal; and when determining that the terminal does not successfully receive the downlink data based on the target signaling, resending the downlink data to the terminal.

According to a third aspect of the present disclosure, there is provided a device for transmitting downlink data. The device is applied in a terminal, and includes: a first detector, a signaling generator, and a signaling transmitter. The first detector is configured to, when the terminal is in a target state and receives downlink data sent by a base station, detect whether the downlink data is successfully received, and obtain a detection result. The signaling generator is configured to generate a target signaling for indicating the detection result. The signaling transmitter is configured to send the target signaling to the base station, so that the base station resends the downlink to the terminal when the terminal does not successfully receive the downlink data according to the target signaling.

According to a fourth aspect of the present disclosure, there is provided a device for confirming data transmission, wherein the device is applied in a base station. The device includes: a data transmitter, a signaling receiver, and a first data retransmitter. The data transmitter is configured to send downlink data to a terminal in a target state. The signaling receiver is configured to receive a target signaling for indicating whether the terminal successfully receives a detection result of the downlink data sent by the terminal. The first data retransmitter is configured to, when determining that the terminal does not successfully receive the downlink data based on the target signaling, resend the downlink data to the terminal.

According to a fifth aspect of the present disclosure, there is provided a device for transmitting downlink data, including: a processor; and a memory for storing instructions executable by the processor. The processor is configured to: when the terminal is in a target state and receives downlink data sent by a base station, detect whether the downlink data is successfully received, and obtaining a detection result; generate a target signaling for indicating the detection result; and send the target signaling to the base station, so that the base station resends the downlink data to the terminal when determining that the terminal does not successfully receive the downlink data according to the target signaling.

According to a sixth aspect of the present disclosure, there is provided a device for transmitting downlink data, including: a processor; and a memory for storing instructions executable by the processor. The processor is configured to: send downlink data to a terminal in a target state; receive a target signaling for indicating whether the terminal successfully receives a detection result of the downlink data sent by the terminal; and when determining that the terminal does not successfully receive the downlink data based on the target signaling, resend the downlink data to the terminal.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the disclosure. Instead, they are merely examples of apparatuses and methods consistent with aspects related to the disclosure as recited in the appended claims.

The terms used in the present disclosure only tend to depict specific embodiments, rather than restricting the present disclosure. Unless the exceptional case in which the context clearly gives supports, the singular forms "a", "an", and "the" used in the present disclosure and accompany claims are intended to include the plural forms. It should also be appreciated that the expression "and/or" used herein indicates including any and all possible combinations of one or more of the associated listed items.

It should be understood, although terms first, second, third and the like are used in the present disclosure to depict various information, such information is not restricted by these terms. These terms are only used to distinguish information of the same type from each other. For example, without departing from the scope of the present disclosure, the first information may also be referred to as the second information. Similarly, the second information may also be referred to as the first information. Depending on context, the word "if" used herein may be explained to "when" or "upon" or "in response to determining . . . ."

In the upcoming $5^{th}$ generation mobile communication technology (5G) network, an RRC state is added, which is an INACTIVE state. When the terminal is in the INACTIVE state, the RRC connection is not established between the terminal and the base station, and in the INACTIVE state, the terminal is allowed to receive the downlink data sent by the base station without performing state switching.

Since the related art does not support the INACTIVE state, when the terminal is in the INACTIVE state, the base station cannot know whether the terminal successfully receives the downlink data sent by the base station, which affects the normal use of the terminal service, thereby affecting the user experience.

Figure 1:
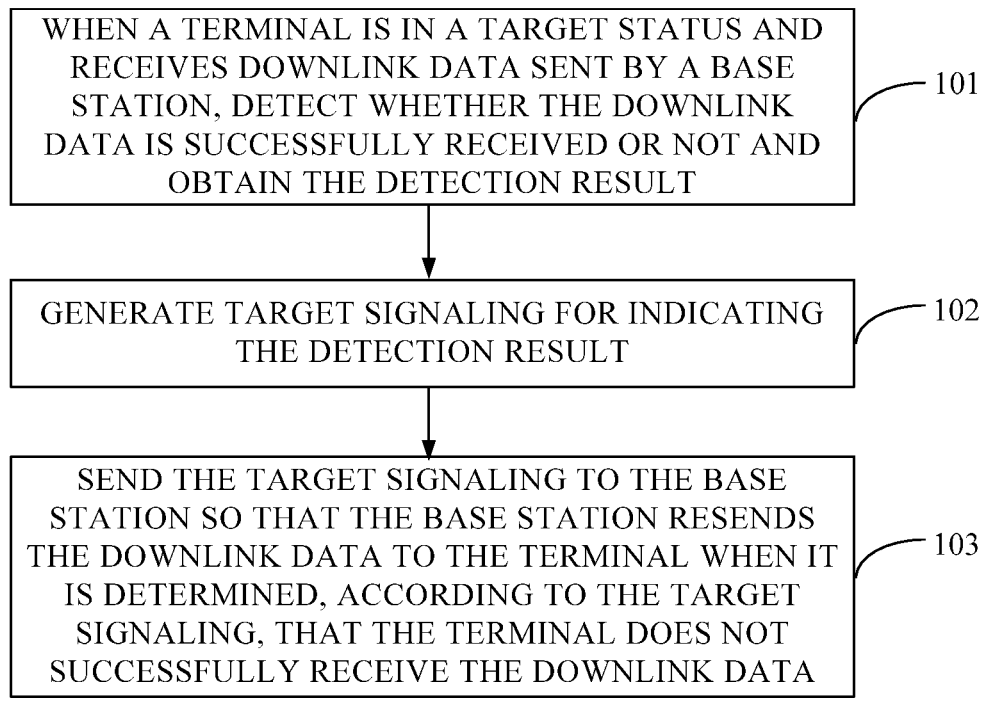
FIG. 1 is a flowchart of a method for transmitting downlink data according to an example.

In order to solve the above problem, the present disclosure provides a method for transmitting downlink data, which may be applied to a terminal, such as a mobile phone, a tablet, a Personal Digital Assistant (PDA), or the like. FIG. 1 is a flowchart of a method for transmitting downlink data according to an example, which may include the following steps.

In step 101, when the terminal is in a target state and receives downlink data sent by a base station, it is detected whether the downlink data is successfully received, and a detection result is obtained. The base station may be in a 5G network.

In the embodiments of the present disclosure, the target state is a state in which the terminal does not perform a radio resource control connection with the base station, and the terminal is allowed to receive the downlink data under the condition that the terminal does not perform state switching. That is, the target state is an INACTIVE state in the 5G network. For example, the terminal is in an RRC_INACTIVE state. In this state, the interaction between the terminal and the base station does not generate a state switching signaling, and the terminal can receive the downlink data sent by the base station.

In this step, the terminal may determine whether the terminal establishes an RRC connection with the base station and whether a state switching signaling is generated before receiving the downlink data sent by the base station. When the RRC connection is not established and the state switching signaling is not generated, it is determined that the terminal is in the target state.

Further, the terminal may detect whether the downlink data is successfully received according to the related art, thereby obtaining the detection result.

In step 102, a target signaling for indicating the detection result is generated.

Figure 2:
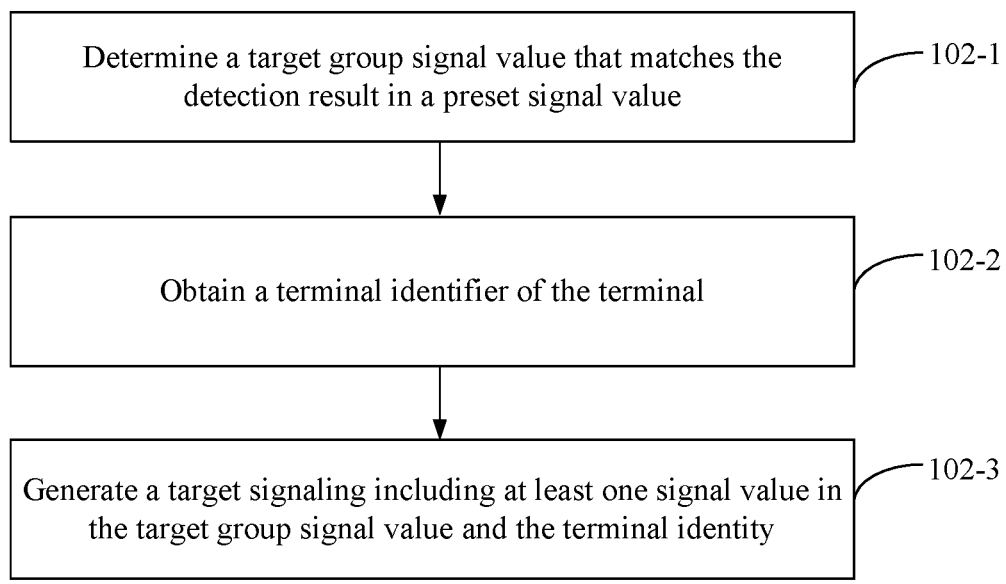
FIG. 2 is a flowchart of another method for transmitting downlink data according to an example.

Optionally, FIG. 2 is a flowchart of another method for transmitting downlink data according to an example, referring to FIG. 2, the foregoing step 102 may include the following step.

In step 102-1, a target group signal value that matches the detection result is determined in a preset signal value.

In the embodiments of the present disclosure, the above preset signal value may be provided by an operator. The same group of preset signal values represents the same detection result with respect to both the terminal and the base station. Optionally, the preset signal value may adopt a pre-designated preamble. The preamble is generally located before a frame header of a first frame of the downlink, and is mainly used for various estimations in the multi-cell implementation scheme, calculation of relative positions between the base stations, and obtaining information such as power and quality of signals received by the neighboring base stations. In the embodiments of the present disclosure, the preset signal value directly adopts the preamble in the related art, which saves a workload for configuring the preset signal value for the terminal and the base station.

In this step, two or more groups of different preset signal values may be set, and different groups of preset signal values correspond to different detection results. The number of each group of the preset signal values may be one or more. For example, the first group of preset signal values corresponds to the terminal successfully receiving the downlink data, and the second group of preset signal values corresponds to the terminal not successfully receiving the downlink data.

The terminal may determine, according to the detection result determined in the foregoing step 101, a target group signal value that matches the detection result among the preset signal values.

For example, the detection result is that the terminal successfully receives the downlink data, and the target group signal value is the first group preset signal value; otherwise, the target group signal value is the second group preset signal value.

In step 102-2, a terminal identifier of the terminal is obtained.

In this step, the terminal identifier may be any information that may identify the terminal. Alternatively, the terminal identifier may be an International Mobile Equipment Identity (IMEI), or a Subscriber Identification Module (SIM) card number or the like. The terminal may obtain the terminal identifier according to the related art, so that the base station resends the downlink data to the terminal according to the terminal identifier subsequently. The execution order of the above steps 102-1 and 102-2 may also be reversed, i.e., the step 102-2 may be performed first, and then the step 102-1 is performed.

In step 102-3, a target signaling including at least one signal value in the target group signal values and the terminal identity is generated.

In this step, the terminal may generate a target signaling including the target group signal value and the terminal identifier according to a preset signaling format. When the number of the target group signal values is multiple, at least one signal value located at a preset position in the target group signal value may be selected, and the selected signal value should represent the detection result.

For example, two groups of preset signal values are shown in Table 1.

TABLE 1

| Preset signal value | Corresponding detection result |
|---|---|
| 1000101011 | The terminal successfully receives the downlink data |
| 1001100010 | The terminal does not successfully receive the downlink data |

The last bit of the above two groups of preset signal values may be selected to indicate different detection results. When the selected signal value is 1, it corresponds to the detection result that the terminal successfully receives the downlink data; and when the selected signal value is 0, it corresponds to the detection result that the terminal does not successfully receive the downlink data.

In addition, since the values of the $2^{nd}$ bit and the $3^{rd}$ bit of the two groups of preset signal values are the same, it is possible to select the signal value of the $2^{nd}$ bit and/or the $3^{rd}$ bit to indicate the detection result.

In step 103, the target signaling is sent to the base station, so that the base station resends the downlink data to the terminal when determining that the terminal does not successfully receive the downlink data according to the target signaling.

In this step, optionally, after generating the target signaling, the terminal may send the target signaling to the base station by using a preset resource. The preset resource includes at least one of a preset time domain resource, a preset frequency domain resource, and a preset space resource. The preset time domain resource may be a preset subframe in the time domain, the preset frequency domain resource may be a preset carrier in the frequency domain, and the space resource may be a preset antenna of the terminal.

After receiving the target signaling, the base station may determine the detection result according to at least one signal value in the target group signal values in the target signaling, that is, determine whether the terminal successfully receives the downlink data. When it is determined that the terminal does not successfully receive the downlink data, the base station may resend the downlink data to the terminal according to the terminal identifier in the target signaling.

In the above embodiment, when the terminal is in the target state and receives the downlink data sent by the base station, whether the downlink data is successfully received may be detected, thereby obtaining the detection result. Further, the generated target signaling for indicating the detection result is sent to the base station, and when determining, according to the target signaling, that the terminal does not successfully receive the downlink data, the base station resends the downlink data to the terminal. Through the above process, when the terminal is in the target state and receives the downlink data sent by the base station, it can be ensured that the base station can determine whether the terminal successfully receives the downlink data. When the terminal does not successfully receive the downlink data, the base station resends the downlink data, ensuring normal use of the terminal service, and improving the user experience.

Figure 3:
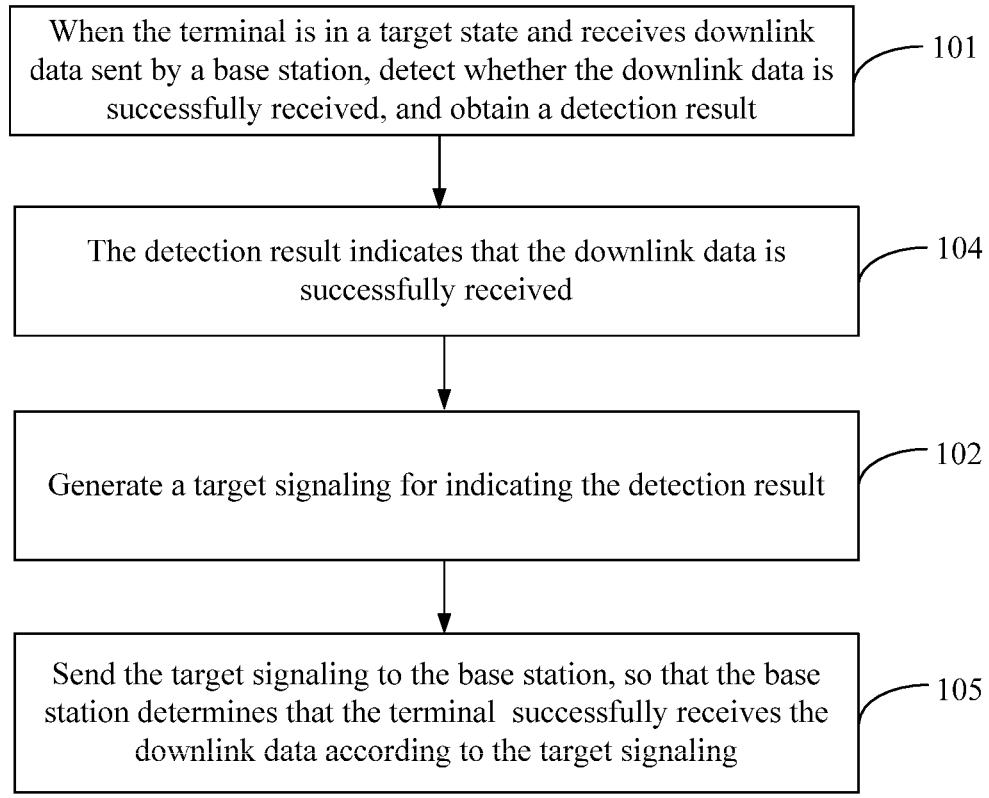
FIG. 3 is a flowchart of another method for transmitting downlink data according to an example.

Optionally, FIG. 3 is another flowchart of transmitting downlink data according to an example, referring to FIG. 3, after completing step 101, the following steps may further be included.

In step 104, when the detection result indicates that the downlink data is successfully received, step 102 is performed.

In this step, after obtaining the detection result, when the terminal determines that the detection result is that the downlink data is successfully received, the above step 102 is performed to generate the target signaling for indicating the detection result. Correspondingly, only one group of preset signal values may be selected to correspond to the detection result that the terminal successfully receives the downlink data. After acquiring the terminal identifier, the terminal may generate the target signaling including at least one signal value of the group of preset signal values and the terminal identifier according to the related art.

Through the foregoing process, the target signaling may be generated by the terminal when the downlink data link is successfully received, and the target signaling includes at least one signal value in the preset signal values and a terminal identifier. The base station determines that the terminal successfully receives the downlink data as long as the target signaling is received, and the base station does not need to resend the downlink data to the terminal.

In the above embodiment, the terminal sends the target signaling to the base station only when it is determined that the downlink data is successfully received. When the terminal determines that the downlink data is not successfully received, there is no need to send the target signaling. The base station may automatically determine that the terminal does not successfully receive the downlink data when determining that the target signaling is not received within a preset time period after sending the downlink data to the terminal, thereby avoiding occupation of the terminal resources, and simplifying the interaction process between the terminal and the base station.

Figure 4:
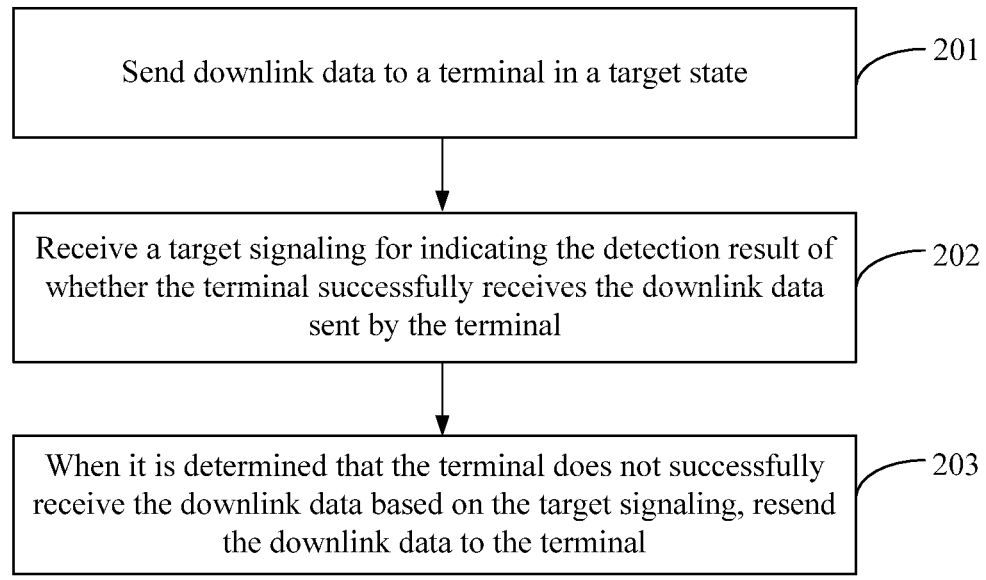
FIG. 4 is a flowchart of another method for transmitting downlink data according to an example.

The present disclosure also provides another method for transmitting downlink data, which may be applied to a base station. FIG. 4 is a flowchart of another method for transmitting downlink data according to an example, which may include the following steps.

In step 201, downlink data is sent to a terminal in a target state.

In the embodiment of the present disclosure, the target state is a state in which the terminal does not perform a radio resource control connection with the base station, and the terminal is allowed to receive the downlink data on condition that no state switching is performed by the terminal. That is, the terminal is in the RRC_INACTIVE state. In this state, the interaction between the terminal and the base station does not generate a state switching signaling, and the terminal can receive the downlink data sent by the base station.

In this step, the base station may send the downlink data to the terminal in the target state according to the related art.

In step 202, a target signaling for indicating the detection result of whether the terminal successfully receives the downlink data sent by the terminal is received.

In the embodiment of the present disclosure, the base station may send the downlink data to the terminal, and the terminal detects whether the downlink data is successfully received, and obtains a detection result. Further, the target signaling for indicating the detection result is generated and sent to the base station.

In this step, the base station may receive the target signaling according to related art.

In step 203, when it is determined that the terminal does not successfully receive the downlink data based on the target signaling, the downlink data is resent to the terminal.

In this step, optionally, the target signaling includes at least one signal value of the target group signal value that matches the detection result and the terminal identifier. The base station may determine, according to the at least one signal value of the target group signal value that matches the detection result, whether the terminal successfully receives the downlink data. When it is determined that the terminal does not successfully receive the downlink data, the downlink data is resent to the terminal according to the terminal identifier, until the terminal successfully receives the downlink data.

In the foregoing embodiment, after sending the downlink data to the terminal in the target state, the base station may determine, according to the received target signaling, whether the terminal successfully receives the downlink data, so that when the terminal does not successfully receive the downlink data, the downlink data is resent to the terminal, until the terminal successfully receives the downlink data, thereby ensuring normal use of the service when the terminal is in the target state, and improving the user experience.

Figure 5:
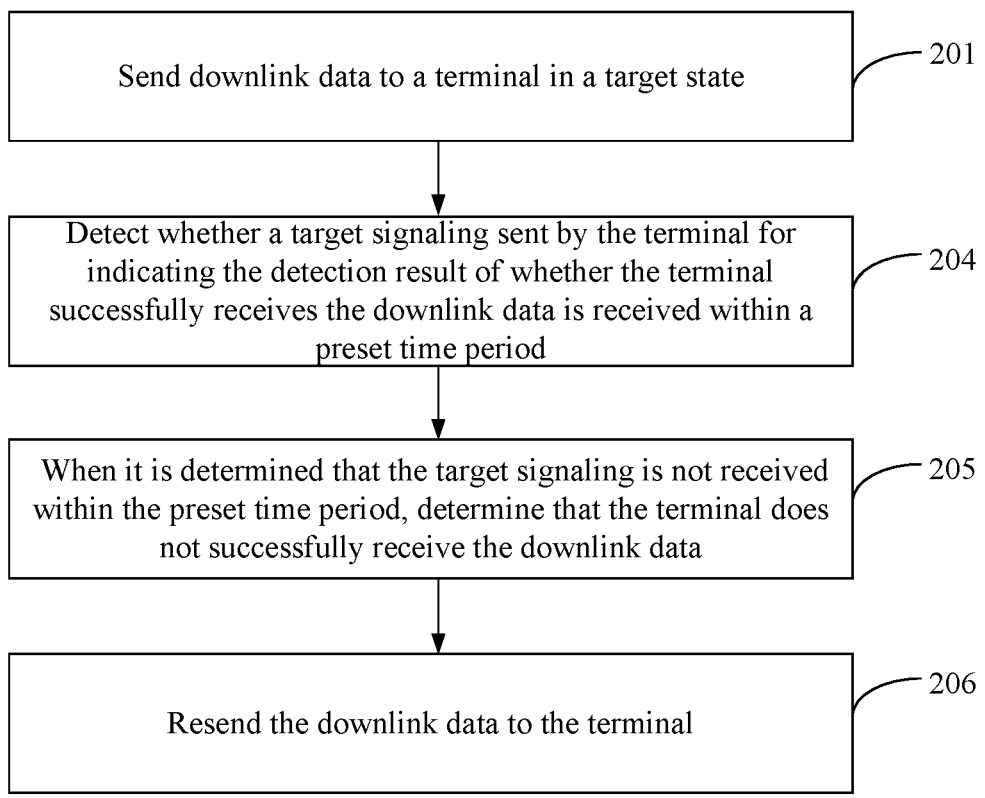
FIG. 5 is a flowchart of another method for transmitting downlink data according to an example.

Optionally, FIG. 5 is a flowchart of another transmission of downlink data according to an example, referring to FIG. 5, after the step 201 is completed the following steps may be further included.

In step 204, it is detected whether a target signaling sent by the terminal for indicating the detection result of whether the terminal successfully receives the downlink data is received within a preset time period.

In this step, the base station may set a time window after sending the downlink data to the terminal, where a duration of the time window is a duration of the preset time period. Before the time window expires, it is detected whether the target signaling sent by the terminal is received.

In step 205, when it is determined that the target signaling is not received within the preset time period, it is determined that the terminal does not successfully receive the downlink data.

In this step, when the target signaling is not received when the time window expires, it may be determined that the terminal does not successfully receive the downlink data.

In step 206, the downlink data is resent to the terminal.

In this step, when the base station sends the downlink data to the terminal, the terminal identifier of the terminal has been recorded. When it is determined that the terminal does not successfully receive the downlink data, the downlink data may be resent to the terminal according to the previously recorded terminal identifier, until the terminal successfully receives the downlink data.

Optionally, the terminal may send the target signaling to the base station only when it is determined that the downlink data is successfully received. When the base station has not received the target signaling when the time window expires, it may also be determined that the terminal does not successfully receive the downlink data, and the downlink data needs to be resent to the terminal.

In the foregoing embodiment, when the base station does not receive the target signaling returned by the terminal within a preset time period for sending the downlink data to the terminal, the base station may also determine that the terminal does not successfully receive the downlink data. At this time, the base station may resend the downlink data to the terminal, until the terminal successfully receives the downlink data, thereby ensuring normal use of the terminal service, and improving the user experience.

Figure 6A:
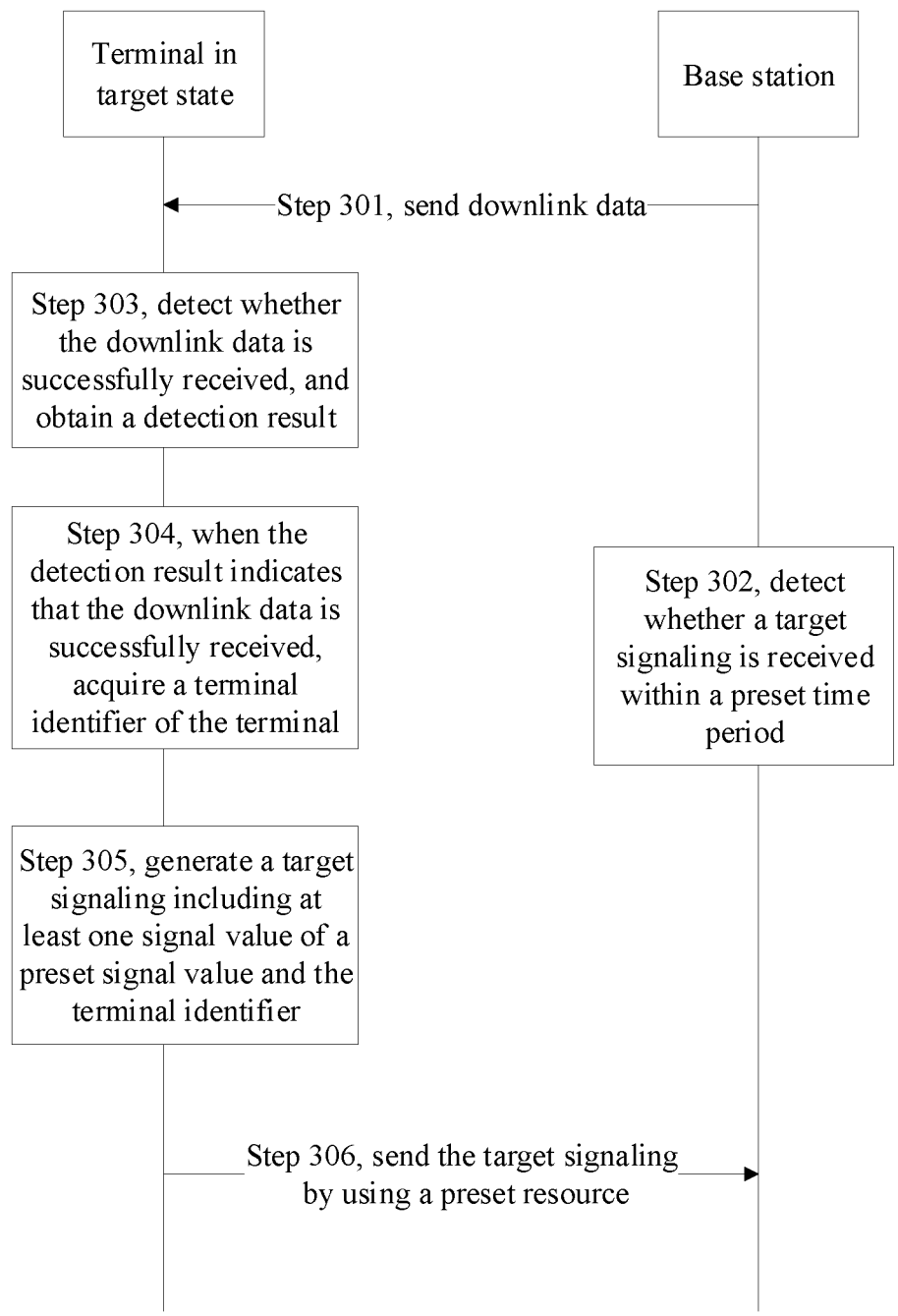
FIG. 6A is a flowchart showing a method for transmitting downlink data according to an example.

The present disclosure further provides another method for transmitting downlink data. FIG. 6A is a flowchart of another method for transmitting downlink data according to an example, referring to FIG. 6A, the method may include the following steps.

In step 301, a base station sends downlink data to a terminal in a target state.

The target state is a state in which the terminal does not perform a radio resource control connection with the base station, and the terminal is allowed to receive the downlink data under the condition that the terminal does not perform state switching.

In this step, the base station may broadcast or unicast the downlink data to the terminal.

In step 302, the base station detects whether a target signaling sent by the terminal is received within a preset time period.

In this step, after the base station sends the downlink data to the terminal, a time window may be set, and a duration of the time window is a duration of the preset time period. Before the time window expires, it is detected whether the target signaling sent by the terminal is received.

In step 303, the terminal detects whether the downlink data is successfully received, and obtains a detection result.

When the detection result indicates that the downlink data is successfully received, then steps 304 to 306 are continued.

In step 304, when the detection result indicates that the downlink data is successfully received, the terminal acquires a terminal identifier of the terminal.

In step 305, the terminal generates a target signaling including at least one signal value of a preset signal value and the terminal identifier.

In the embodiment of the present disclosure, only one group of the preset signal values is set, and the preset signal value matches the detection result that the terminal successfully receives the downlink data.

In step 306, the terminal sends the target signaling to the base station by using a preset resource.

The preset resource includes at least one of a preset time domain resource, a preset frequency domain resource, and a preset space resource.

For the base station, when the downlink data is sent from the base station to the terminal, the base station starts to perform step 302 to detect whether the target signaling sent by the terminal is received within a preset time period. When the terminal successfully receives the downlink data, the target signaling is sent to the base station, and the base station does not need to resend the downlink data when receiving the target signaling within the preset time period.

In the above embodiment, when the terminal is in the target state and receives the downlink data sent by the base station, it may be ensured that the base station can determine that the terminal successfully receives the downlink data. It ensures the normal use of terminal services and improves the user experience.

Figure 6B:
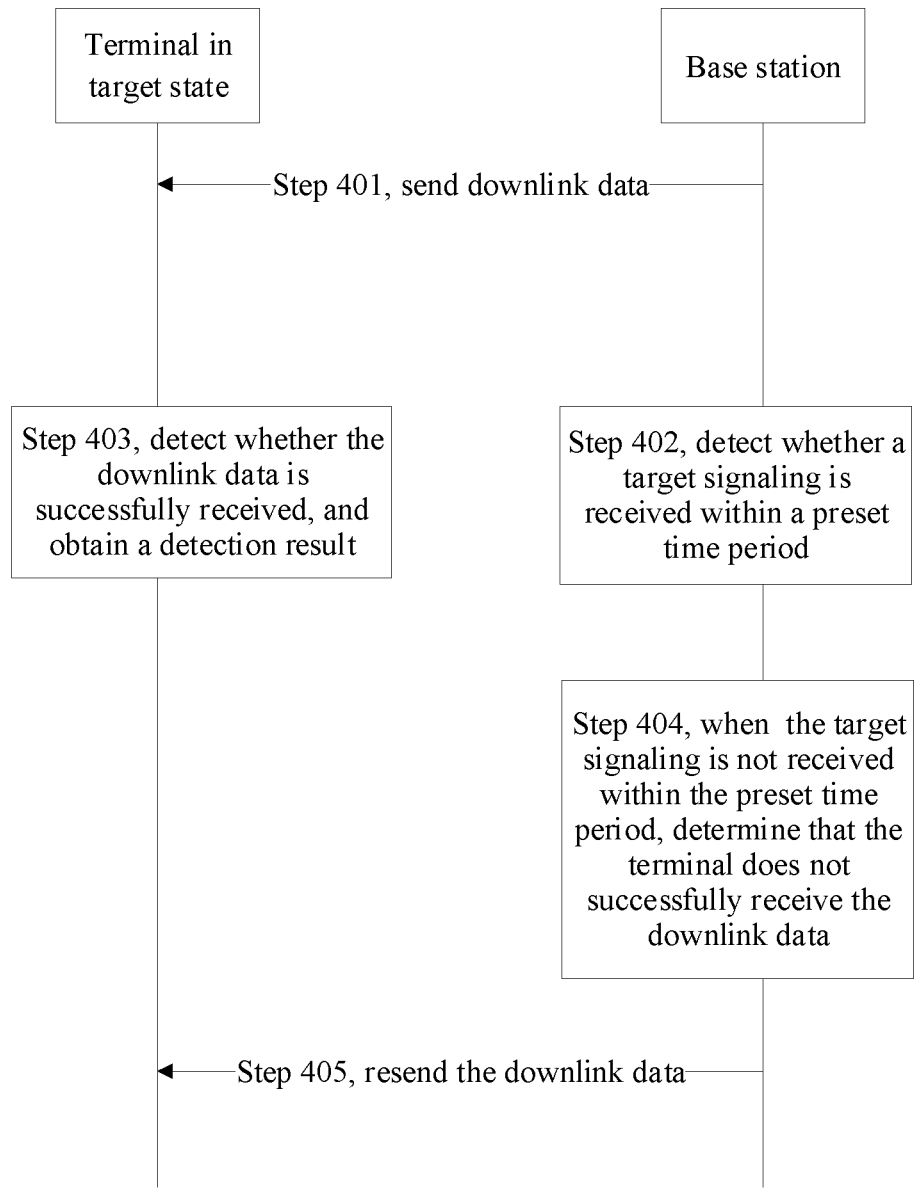
FIG. 6B is a flowchart of another method for transmitting downlink data according to an example.

The present disclosure further provides another method for transmitting downlink data. FIG. 6B is a flowchart of another method for transmitting downlink data according to an example, referring to FIG. 6B, the method may include the following steps.

In step 401, a base station transmits downlink data to a terminal in a target state.

In step 402, the base station detects whether a target signaling sent by the terminal is received within a preset time period.

In step 403, the terminal detects whether the downlink data is successfully received, and obtains a detection result.

When the detection result indicates that the downlink data is not successfully received, the terminal does not send the target signaling to the base station.

In step 404, when the base station does not receive the target signaling within the preset time period, it is determined that the terminal does not successfully receive the downlink data.

In step 405, the base station resends the downlink data to the terminal.

In the above embodiment, the base station determines that the terminal does not successfully receive the downlink data when the target signaling returned by the terminal is not received within a preset time period after the downlink data is sent to the terminal. At this time, the downlink data may be resent to the terminal, thereby ensuring the normal use of terminal services and improving the user experience.

For the foregoing respective method embodiments, for the sake of brevity, they are all described as a series of combinations of actions, but those skilled in the art should understand that the present disclosure is not limited by the described order of actions, because according to the present disclosure, some steps may be performed in other orders or at the same time.

In addition, those skilled in the art should also understand that the embodiments described in the specification are optional embodiments, and the actions and modules involved are not necessarily required by the present disclosure.

Corresponding to the foregoing application function implementation method embodiment, the present disclosure also provides an embodiment of an application function implementation device and a corresponding terminal.

Figure 7:
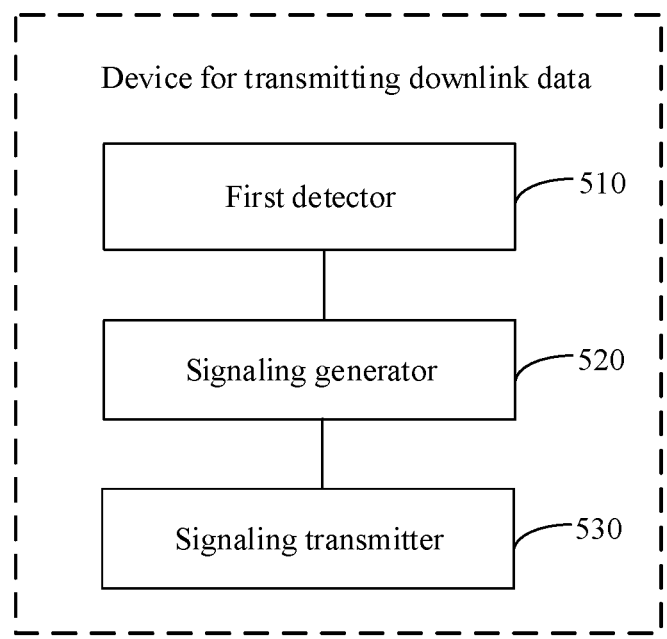
FIG. 7 is a block diagram of a device for transmitting downlink data according to an example.

FIG. 7 is a block diagram of a device for transmitting downlink data according to an example, referring to FIG. 7, the device may be disposed on a terminal, and includes: a first detector 510, a signaling generator 520, and a signaling transmitter 530.

The first detector 510 is configured to, when the terminal is in a target state and receives downlink data sent by a base station, detect whether the downlink data is successfully received, and obtain a detection result.

The signaling generator 520 is configured to generate a target signaling for indicating the detection result.

The signaling transmitter 530 is configured to send the target signaling to the base station, so that the base station resends the downlink data to the terminal when the terminal does not successfully receive the downlink data according to the target signaling.

Figure 8:
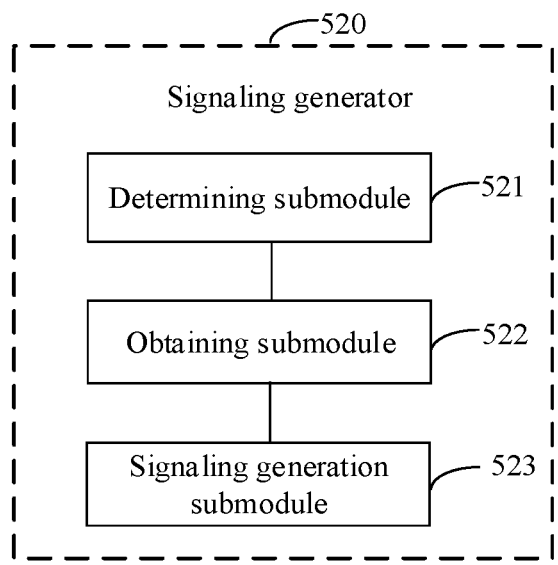
FIG. 8 is a block diagram of another device for transmitting downlink data according to an example.

FIG. 8 is a block diagram of another device for transmitting downlink data according to an example. Referring to FIG. 8, on the basis of the embodiment shown in FIG. 7, the signaling generator 520 includes: a determining submodule 521, an obtaining submodule 522, and a signaling generation submodule 523.

The determining submodule 521 is configured to determine, in a preset signal value, a target group signal value that matches the detection result.

The obtaining submodule 522 is configured to acquire a terminal identifier of the terminal.

The signaling generation submodule 523 is configured to generate a target signaling including at least one signal value in the target group signal value and the terminal identifier.

Figure 9:
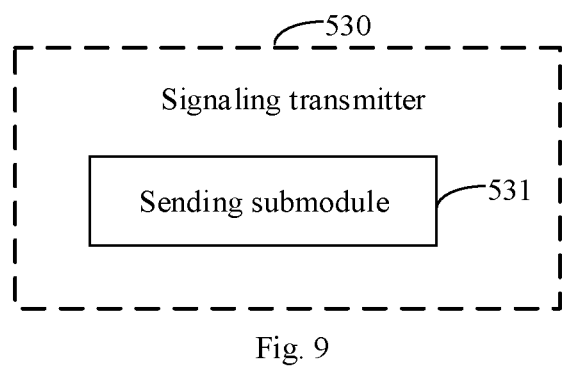
FIG. 9 is a block diagram of another device for transmitting downlink data according to an example.

FIG. 9 is a block diagram of another device for transmitting downlink data according to an example. Referring to FIG. 9, on the basis of the embodiment shown in FIG. 7, the signaling transmitter 530 includes: a sending submodule 531.

The sending submodule 531 is configured to send the target signaling to the base station by using a preset resource.

The preset resource includes at least one of a preset time domain resource, a preset frequency domain resource, and a preset space resource.

Figure 10:
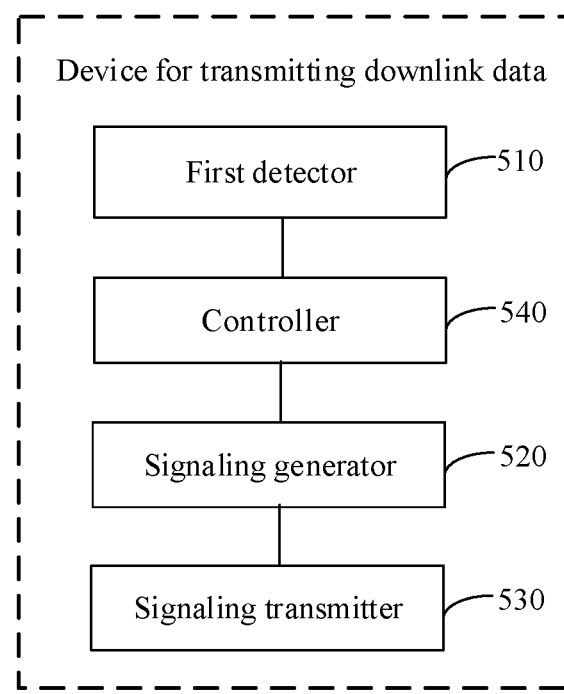
FIG. 10 is a block diagram of another device for transmitting downlink data according to an example.

FIG. 10 is a block diagram of another device for transmitting downlink data according to an example. Referring to FIG. 10, based on the embodiment shown in FIG. 7, the device further includes: a controller 540.

The controller 540 is configured to, when the detection result indicates that the downlink data is successfully received, control the signaling generator to generate the target signaling for indicating the detection result.

Optionally, the target state is a state in which the terminal does not perform a radio resource control connection with the base station, and the terminal is allowed to receive the downlink data on condition that no state switching is performed by the terminal.

Figure 11:
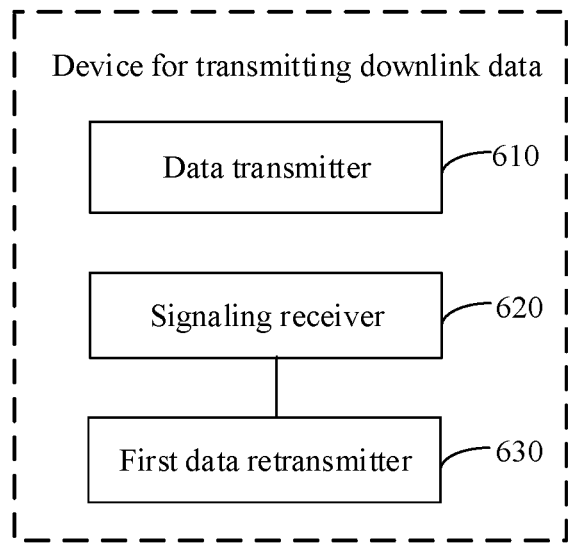
FIG. 11 is a block diagram of another device for transmitting downlink data according to an example.

FIG. 11 is a block diagram of another device for transmitting downlink data according to an example, referring to FIG. 11, the device may be disposed at a base station, and includes: a data transmitter 610, a signaling receiver 620, and a first data retransmitter 630.

The data transmitter 610 is configured to send downlink data to the terminal in the target state.

The signaling receiver 620 is configured to receive a target signaling for indicating the detection result of whether the terminal successfully receives the downlink data sent by the terminal.

The first data retransmitter 630 is configured to resend the downlink data to the terminal when it is determined that the terminal does not successfully receive the downlink data based on the target signaling.

Figure 12:
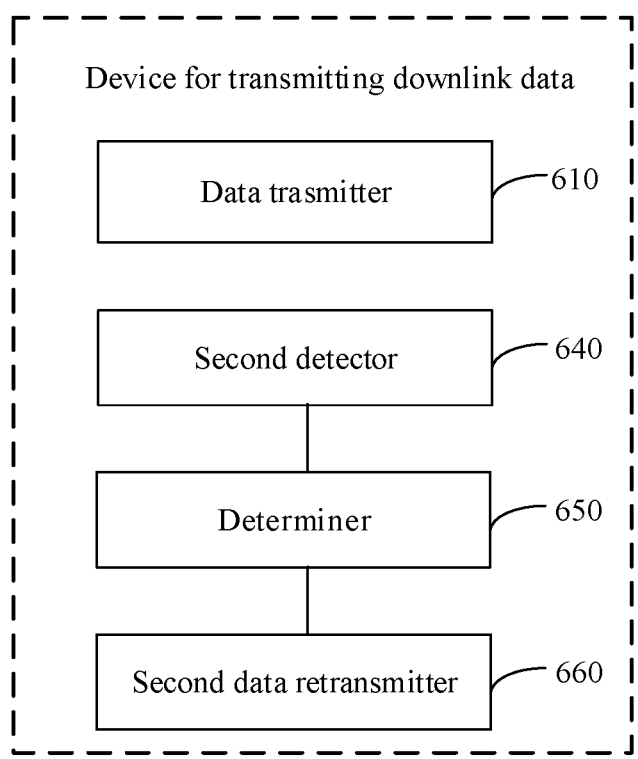
FIG. 12 is a block diagram of another device for transmitting downlink data according to an example.

FIG. 12 is a block diagram of another device for transmitting downlink data according to an example. Referring to FIG. 12, based on the embodiment shown in FIG. 11, the device further includes: a second detector 640, a determiner 650, and a second data retransmitter 660.

The second detector 640 is configured to detect whether the target signaling for indicating the detection result of whether the terminal successfully receives the downlink data sent by the terminal is received in a preset time period.

The determiner 650 is configured to, when determining that the target signaling is not received within the preset time period, determine that the terminal does not successfully receive the downlink data.

The second data retransmitter 660 is configured to resend the downlink data to the terminal.

Optionally, the target state is a state in which the terminal does not perform a radio resource control connection with the base station, and the terminal is allowed to receive the downlink data on condition that no state switching is performed by the terminal.

With regard to the devices in the above respective embodiments, the specific manner in which the respective modules perform the operations has been described in detail in the embodiment relating to the method, and will not be explained in detail herein.

Correspondingly, the embodiment of the present disclosure further provides a device for transmitting downlink data, which is disposed in a terminal, and includes:

a processor;

a memory for storing instructions executable by the processor;

wherein the processor is configured to:

when the terminal is in a target state and receives downlink data sent by a base station, detect whether the downlink data is successfully received, and obtaining a detection result;

generate a target signaling for indicating the detection result; and send the target signaling to the base station, so that the base station resends the downlink data to the terminal when determining that the terminal does not successfully receive the downlink data according to the target signaling.

Figure 13:
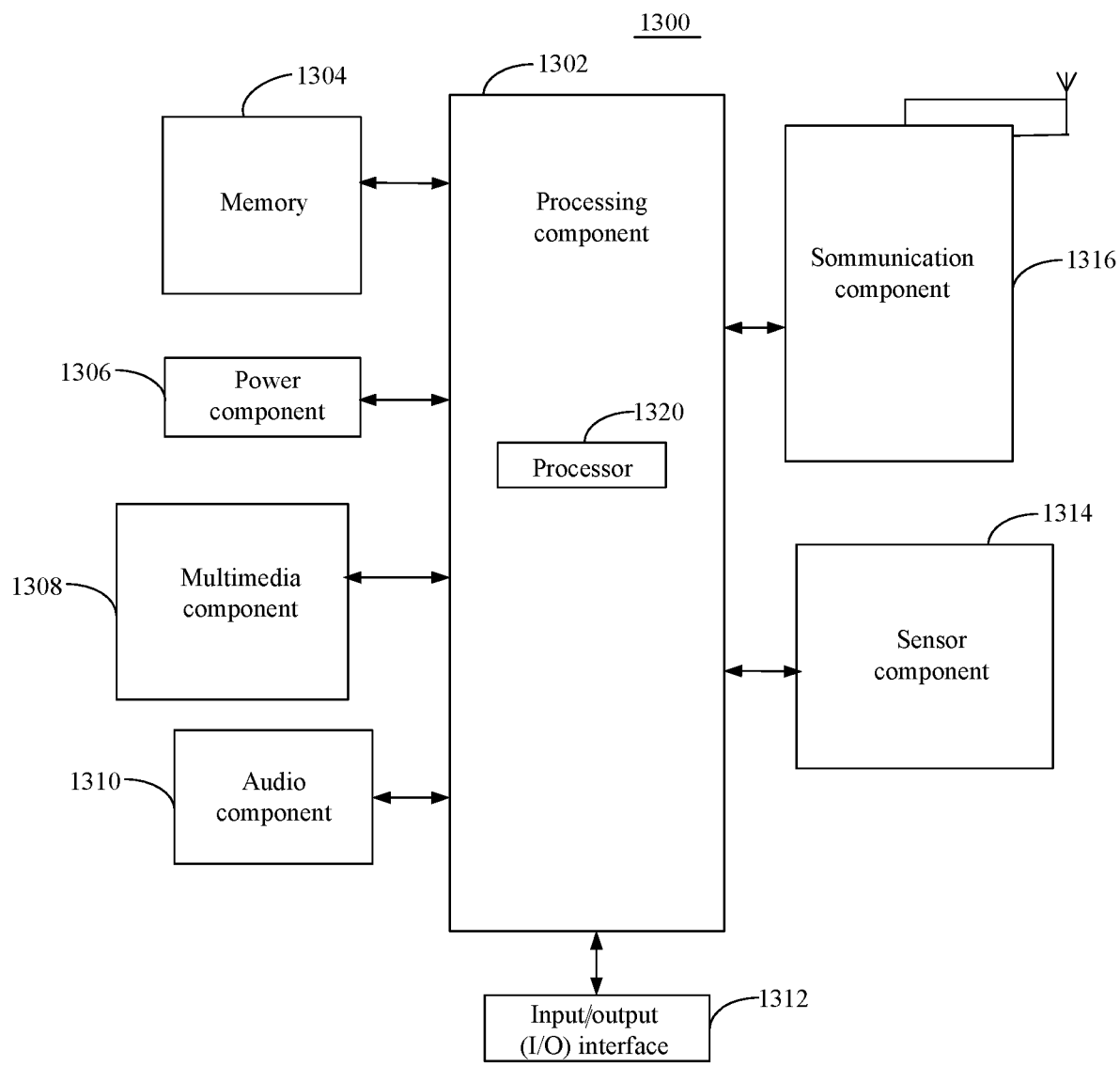
FIG. 13 is a schematic structural diagram of a transmission device for downlink data according to an example of the present disclosure.

FIG. 13 is a block diagram of a device 1300 for transmitting downlink data according to an example. For example, the device 1300 may be a terminal, and particularly, may be a mobile phone, a computer, a digital broadcast terminal, a messaging device, a gaming console, a tablet, a medical device, exercise equipment, a personal digital assistant, and wearable devices such as a smart watch, smart glasses, a smart bracelet, a smart running shoes, etc.

Referring to FIG. 13, the device 1300 may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 typically controls overall operations of the device 1300, such as the operations associated with display, telephone calls, data communications, camera operations, and recording operations. The processing component 1302 may include one or more processors 1320 to execute instructions to perform all or part of the steps in the above described methods. Moreover, the processing component 1302 may include one or more modules which facilitate the interaction between the processing component 1302 and other components. For instance, the processing component 1302 may include a multimedia module to facilitate the interaction between the multimedia component 1308 and the processing component 1302.

The memory 1304 is configured to store various types of data to support the operation of the device 1300. Examples of such data include instructions for any applications or methods operated on the device 1300, contact data, phonebook data, messages, pictures, video, etc. The memory 1304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the device 1300. The power component 1306 may include a power management system, one or more power sources, and any other components associated with the generation, management, and distribution of power in the device 1300.

The multimedia component 1308 includes a screen providing an output interface between the device 1300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1308 includes a front camera and/or a rear camera. The front camera and the rear camera may receive an external multimedia datum while the device 1300 is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a microphone ("MIC") configured to receive an external audio signal when the device 1300 is in an operation mode, such as a call mode, a recording mode, and a voice recognition mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and peripheral interface modules, such as a keyboard, a click wheel, buttons, and the like. The buttons may include, but are not limited to, a home button, a volume button, a starting button, and a locking button.

The sensor component 1314 includes one or more sensors to provide status assessments of various aspects of the device 1300. For instance, the sensor component 1314 may detect an open/closed status of the device 1300, relative positioning of components, e.g., the display and the keypad, of the device 1300, a change in position of the device 1300 or a component of the device 1300, a presence or absence of user contact with the device 1300, an orientation or an acceleration/deceleration of the device 1300, and a change in temperature of the device 1300. The sensor component 1314 may include a proximity sensor configured to detect the presence of nearby objects without any physical contact. The sensor component 1314 may also include a light sensor, such as a CMOS or CCD image sensor, for use in imaging applications. In some embodiments, the sensor component 1314 may also include an accelerometer sensor, a gyroscope sensor, a magnetic sensor, a pressure sensor, or a temperature sensor.

The communication component 1316 is configured to facilitate communication, wired or wirelessly, between the device 1300 and other devices. The device 1300 can access a wireless network based on a communication standard, such as WiFi, 2G, or 3G, or a combination thereof. In one example, the communication component 1316 receives a broadcast signal or broadcast associated information from an external broadcast management system via a broadcast channel. In one example, the communication component 1316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the device 1300 may be implemented with one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The device 1300 may use the circuitries in combination with the other hardware or software components for performing the above described methods. Each module, submodule, unit, or subunit disclosed above may be implemented at least partially using the one or more circuitries In examples, there is also provided a non-transitory computer-readable storage medium including instructions, such as included in the memory 1304, executable by the processor 1320 in the device 1300, for performing the above-described methods. For example, the non-transitory computer-readable storage medium may be a ROM, a RAM, a CD-ROM, a magnetic tape, a floppy disc, an optical data storage device, and the like.

Correspondingly, the present disclosure further provides a device for transmitting downlink data, applied in a base station, and including: a processor; and a memory for storing instructions executable by the processor. The processor is configured to:

send downlink data to a terminal in a target state;

receive a target signaling for indicating whether the terminal successfully receives a detection result of the downlink data sent by the terminal; and when determining that the terminal does not successfully receive the downlink data based on the target signaling, resend the downlink data to the terminal.

Figure 14:
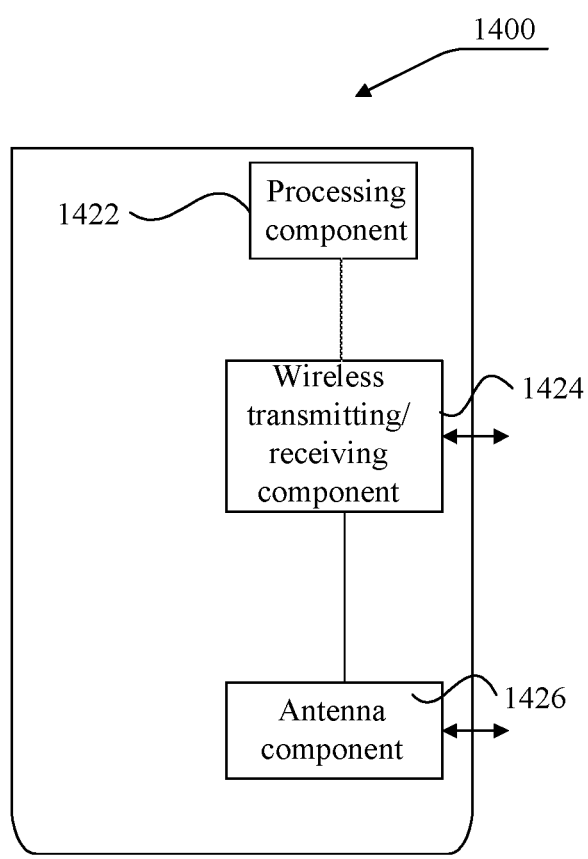
FIG. 14 is a schematic structural diagram of another transmission apparatus for downlink data according to an example of the present disclosure.

FIG. 14 is a block diagram of a device 1400 for transmitting downlink data, according to an example. The device 1400 may be provided as a base station. Referring to FIG. 14, the device 1400 includes a processing component 1422, a wireless transmitting/receiving component 1424, an antenna component 1426, and a signal processing portion specific to the wireless interface. The processing component 1422 may further include one or more processors.

One processor in the processing component 1422 may be configured to: send downlink data to a terminal in a target state; receive a target signaling for indicating whether the terminal successfully receives a detection result of the downlink data sent by the terminal; and when determining that the terminal does not successfully receive the downlink data based on the target signaling, resend the downlink data to the terminal.

The technical solutions provided by the embodiments of the present disclosure may include the following beneficial effects.

In the embodiments of the present disclosure, when the terminal is in the target state and receives the downlink data sent by the base station, the terminal may detect whether the downlink data is successfully received, thereby obtaining the detection result. Further, the generated target signaling for indicating the detection result is sent to the base station, and when determining that the terminal does not successfully receive the downlink data according to the target signaling, the base station resends the downlink data to the terminal. Through the above process, when the terminal is in the target state and receives the downlink data sent by the base station, it can be ensured that the base station can determine whether the terminal successfully receives the downlink data. When the terminal does not successfully receive the downlink data, the base station resends the downlink data, ensuring normal use of the terminal service, and improving the user experience.

In the embodiments of the present disclosure, when the terminal generates the target signaling for indicating the detection result of whether the terminal successfully receives the downlink data, optionally, the target signaling includes at least one of the target group signal value. The target group signal value is a set of signal values that match the current detection result in the preset signal value. When receiving the target signaling, the base station can determine the detection result according to the target group signal value, thereby determining whether the terminal successfully receives the downlink data. In addition, it is ensured that the base station resends the downlink data to the terminal when the terminal does not successfully receive the downlink data. The target signaling further includes a terminal identifier of the terminal. It is ensured that the base station can resend the downlink data to the terminal when the terminal does not successfully receive the downlink data, thereby ensuring normal use of the terminal service and improving the user experience.

In the embodiments of the present disclosure, the terminal may send the generated target signaling to the base station by using a preset resource, where the preset resource includes at least one of a preset time domain resource, a preset frequency domain resource, and a preset space resource. The base station determines whether the terminal successfully receives the downlink data according to the target signaling carried by the preset resource, which is simple to be implemented, and has a high availability.

In the embodiments of the present disclosure, optionally, the target signaling may be sent to the base station when determining that the terminal successfully receives the downlink data sent by the base station. The terminal resources are saved, and the interaction process between the terminal and the base station is simplified.

In the embodiments of the present disclosure, the target state of the terminal is a state in which the terminal does not perform a radio resource control connection with the base station, and the terminal is allowed to receive the downlink data on condition that no state switching is performed by the terminal, i.e., an INACTVE state. In the target state, the interaction between the terminal and the base station does not generate a handover signaling, and the terminal can receive the downlink data sent by the base station. Through the method provided by the embodiments of the present disclosure, it can be ensured that the base station determines whether the terminal successfully receives the downlink data, thereby ensuring the normal use of the terminal service.

In the embodiments of the present disclosure, after sending the downlink data to the terminal in the target state, the base station may determine, according to the received target signaling, whether the terminal successfully receives the downlink data, so that when the terminal does not successfully receive the downlink data, the downlink data is resent to the terminal, until the terminal successfully receives the downlink data, thereby ensuring normal use of the service when the terminal is in the target state, and improving the user experience.

In the embodiments of the present disclosure, when the base station does not receive the target signaling returned by the terminal within a preset time period in which the downlink data is sent to the terminal, the base station may also determine that the terminal does not successfully receive the downlink data. At this time, the base station can resend the downlink data to the terminal, until the terminal successfully receives the downlink data, thereby ensuring normal use of the terminal service, and improving the user experience.

Other embodiments of the present disclosure will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the present disclosure being indicated by the following claims.

The above description is only the preferred embodiment of the present disclosure, and is not intended to limit the present disclosure. Any modifications, equivalents, improvements, etc., which are made within the spirit and principles of the present disclosure, should be included in the protection scope of the present disclosure.

What is claimed is:

1. A method for receiving downlink data, wherein the method is applied in a terminal, and comprises:
   when the terminal is in a target state and receives the downlink data sent by a base station, detecting whether the downlink data is successfully received, and obtaining a detection result, wherein the target state is a state in which the terminal does not perform a radio resource control connection with the base station, and the terminal is allowed to receive the downlink data under the condition that the terminal does not perform state switching;
   generating a target signaling for indicating the detection result; and
   sending the target signaling to the base station, so that the base station resends the downlink data to the terminal when determining that the terminal does not successfully receive the downlink data in accordance with the target signaling,
   wherein the generating the target signaling for indicating the detection result comprises:
   determining, in a preset signal value, a target group signal value that matches the detection result;
   obtaining a terminal identifier of the terminal; and
   generating the target signaling including the terminal identifier and one signal value occupying exactly one bit in the target group signal value;
   wherein the sending the target signaling to the base station comprises:
      sending the target signaling to the base station by using a preset resource;
      wherein the preset resource comprises a preset space resource.

2. The method in accordance with claim 1, wherein after obtaining the detection result, the method further comprises:
   when the detection result indicates that the downlink data is successfully received, performing the step of generating the target signaling for indicating the detection result.

3. A method for confirming data transmission, wherein the method is applied to a base station, and comprises:
   sending downlink data to a terminal in a target state, wherein the target state is a state in which the terminal does not perform a radio resource control connection with the base station, and the terminal is allowed to receive the downlink data under the condition that the terminal does not perform state switching;
   receiving a target signaling including a detection result for indicating whether the terminal successfully receives the downlink data, wherein the target signaling is sent by the terminal through a preset resource, wherein the preset resource comprises a preset space resource, and wherein the target signaling comprises a terminal identifier and one signal value occupying exactly one bit in a target group signal value, and the target group signal value is a group signal value that matches the detection result determined in a preset signal value; and
   when determining that the terminal does not successfully receive the downlink data based on the target signaling, resending the downlink data to the terminal.

4. The method in accordance with claim 3, wherein after sending the downlink data to the terminal in the target state, the method further comprises:
   detecting whether the target signaling for indicating the detection result of whether the terminal successfully receives the downlink data sent by the terminal is received within a preset time period;
   when determining that the target signaling is not received within the preset time period, determining that the terminal does not successfully receive the downlink data; and
   resending the downlink data to the terminal.

5. A device for receiving downlink data, including:
   a processor; and
   a memory for storing instructions executable by the processor;
   wherein the processor is configured to:
   when the device is in a target state and receives the downlink data sent by a base station, detect whether the downlink data is successfully received, and obtain a detection result, wherein the target state is a state in which the terminal does not perform a radio resource control connection with the base station, and the terminal is allowed to receive the downlink data under the condition that the terminal does not perform state switching;
   generate a target signaling for indicating the detection result; and
   send the target signaling to the base station, so that the base station resends the downlink data to the terminal when determining that the terminal does not successfully receive the downlink data in accordance with the target signaling,
   wherein the processor is further configured to:
   determine, in a preset signal value, a target group signal value that matches the detection result;
   obtain a terminal identifier of the terminal; and
   generate the target signaling including the terminal identifier and one signal value occupying exactly one bit in the target group signal value;
   wherein the processor is further configured to:

send the target signaling to the base station by using a preset resource;

wherein the preset resource comprises a preset space resource.

6. The device in accordance with claim 5, wherein the processor is further configured to:

when the detection result indicates that the downlink data is successfully received, control the signaling generator to generate the target signaling for indicating the detection result.

7. A device for receiving downlink data, including:

a processor; and a memory for storing instructions executable by the processor;

wherein the processor is configured to:

send downlink data to a terminal in a target state, wherein the target state is a state in which the terminal does not perform a radio resource control connection with the base station, and the terminal is allowed to receive the downlink data under the condition that the terminal does not perform state switching;

receive a target signaling including a detection result for indicating whether the terminal successfully receives the downlink data, wherein the target signaling is sent by the terminal through a preset resource, wherein the preset resource comprises a preset space resource, and wherein the target signaling comprises a terminal identifier and one signal value occupying exactly one bit in a target group signal value, and the target group signal value is a group signal value that matches the detection result determined in a preset signal value; and when determining that the terminal does not successfully receive the downlink data based on the target signaling, resend the downlink data to the terminal.

8. The device in accordance with claim 7, wherein the processor is further configured to:

detect whether the target signaling for indicating the detection result of whether the terminal successfully receives the downlink data sent by the terminal is received within a preset time period;

when determining that the target signaling is not received within the preset time period, determining that the terminal does not successfully receive the downlink data; and resend the downlink data to the terminal.

* * * * *